Sept. 11, 1928.

T. S. SCOTT 1,683,706

HOLLOW SHAFT COLLECTOR LEAD SUPPORT

Filed April 30, 1926   2 Sheets-Sheet 1

WITNESSES:
C.J.Weller.
O.B.Buchanan.

INVENTOR
Thomas S. Scott.
BY
Wesley G. Carr
ATTORNEY

Sept. 11, 1928.

T. S. SCOTT 1,683,706

HOLLOW SHAFT COLLECTOR LEAD SUPPORT

Filed April 30, 1926    2 Sheets-Sheet 2

WITNESSES:

INVENTOR
Thomas S. Scott.
BY
ATTORNEY

Patented Sept. 11, 1928.

1,683,706

UNITED STATES PATENT OFFICE.

THOMAS S. SCOTT, OF PITTSBURGH, PENNSYLVANIA, ASSIGNOR TO WESTINGHOUSE ELECTRIC & MANUFACTURING COMPANY, A CORPORATION OF PENNSYLVANIA.

HOLLOW-SHAFT COLLECTOR-LEAD SUPPORT.

Application filed April 30, 1926. Serial No. 105,762.

My invention relates to the supporting means for connecting the leads of hollow-shaft motors to the terminal conductors of slip rings.

In large induction-motor locomotives, the space between the wheels is so limited that it has become the usual practice to place the rotor slip rings on an overhanging stud of the shaft outside of the bearing at one or both ends of the machine, the leads being brought out through a perforation in the shaft. In such structures, the whipping or vibration of the overhanging shaft-end has resulted in more or less frequent breakings of the collector leads, resulting in the adoption of many different expedients in various attempts to utilize flexible leads which will stand vibrations, or to successfully clamp the leads in a manner which will avoid vibration.

After many unsuccessful attempts to insulatingly clamp the hollow-shaft leads to prevent breakage either of the leads or of the holder, including an attempt to utilize insulated pin members such as are common in brushholder supports, I have developed a mounting whereby the electrical and mechanical requirements are met.

In brief, my invention comprises a rigid radial terminal connector, which is insulatingly clamped to the end face of the collector-ring support, and which performs the double function of an electrical connector and a rigid mechanical support for holding the hollow-shaft leads against vibration with respect to the shaft-end.

Figure 1:
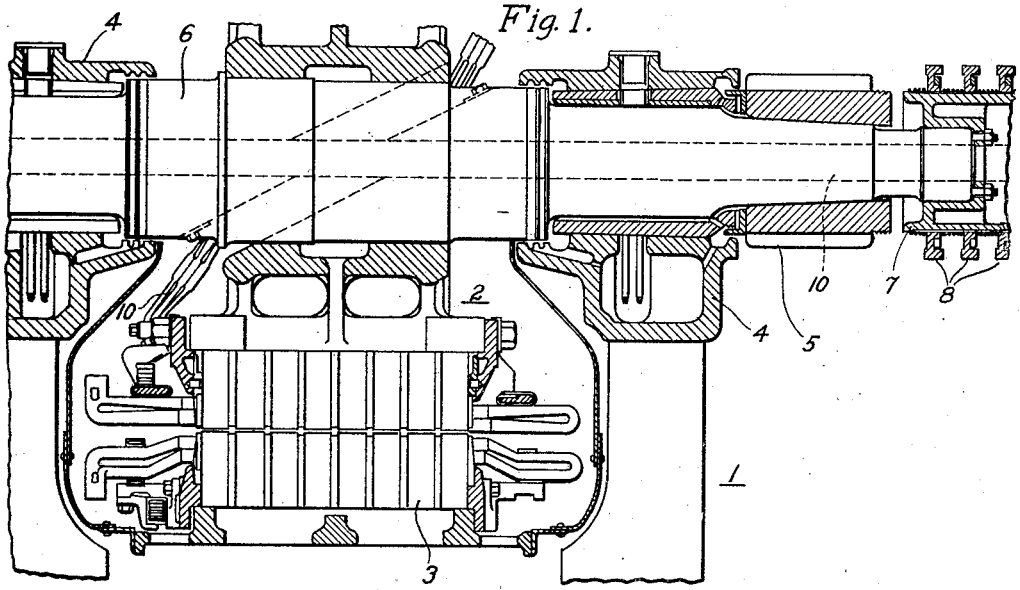
Figure 2:
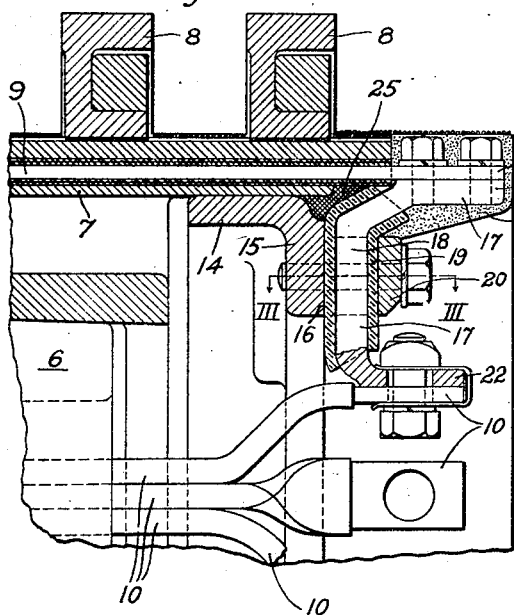
Figure 3:
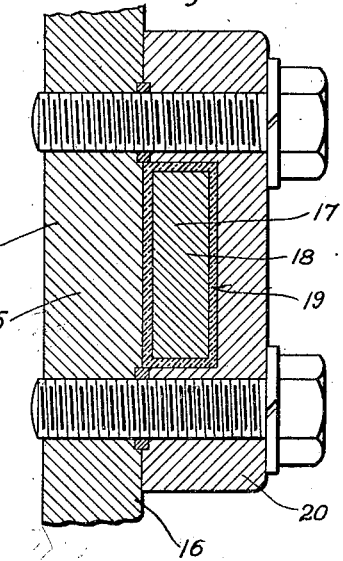
Figure 4:
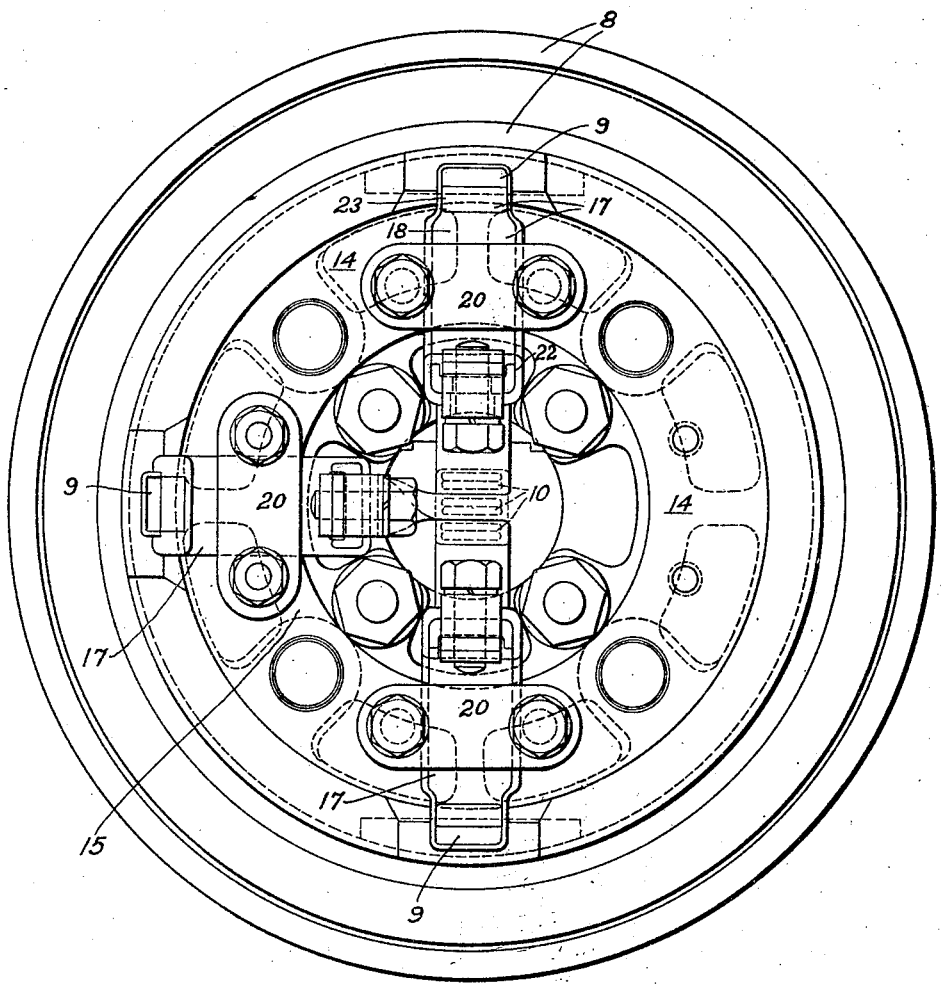

My invention will best be understood by reference to the accompanying drawing, wherein Fig. 1 is a fragmentary longitudinal elevation of the slip-ring end of a motor embodying my invention, Fig. 2 is a longitudinal sectional detail view of the end of the shaft having the slip-rings and my new connector for the leads, Fig. 3 is a sectional view on the line III—III of Fig. 2, showing the clamp for securing the terminal connector of my invention, and Fig. 4 is an end view of the structure shown in Fig. 2, with the gum removed from around the radial terminal connectors.

My invention is shown as being applied to an induction motor 1, which is adapted for driving a railway locomotive, and which comprises a rotor member 2, a stator member 3 and two bearings 4. Connection is made with the locomotive driver wheels (not shown), by means of a pinion 5 which is mounted on an overhanging end of the motor shaft 6, said overhanging end extending beyond the adjacent bearing 4. The overhanging shaft-end carries, at its extreme end, a slip-ring supporting spider 7 which is surrounded with insulation upon which a plurality of slip-rings 8 are supported. As shown in Fig. 2, a plurality of longitudinally extending slip-ring conductors 9 are provided to carry the current from the several slip rings to the end of the slip-ring spider, as is usual in the art.

The motor shaft 6 is hollow to accommodate the rotor terminal leads, which are flexible conductors 10 extending through the hollow shaft. In order to provide a rigid support for the rotor terminal leads 10, a special steel terminal support 14 is press-fitted into the collector-ring spider to provide an annular flange 15 having a plane outer surface 16 to which are clamped a plurality of my special terminal connectors 17 of rigid construction, which are made of a suitable conducting alloy. As shown in Fig. 2, each terminal connector or support 17 comprises a radially extending portion 18, which is inclosed in a moulded mica tube 19 and which is clamped to the end face 16 of the steel terminal support 14 by means of a straddling clamping member 20, as shown more in detail in Fig. 3.

The ends of the terminal connectors 17 are bent outwardly, parallel with the axis, to provide inner and outer rigid supports 22 and 23, to which are clamped the rotor terminal leads 10 and the slip-ring terminal conductors 9, respectively. The small inaccessible space in the corners of the slip-ring spider 7, adjacent to the slip-ring terminal conductors 9 and the terminal connectors 17, are filled with an asphaltum gum 25, and the outer ends of the slip-ring terminal conductors 9 and the terminal connectors or supports 17 are then coated with a packing 26 of flax tow mixed with shellac and varnish, which is baked to provide a hard structure.

By virtue of the broad, flat, clamped connection between the massive radially extending terminal connectors 17 and the annular face 16 of the steel terminal support 14, a very rigid support is provided for the end of each of the leads 10 which extend into the hollow shaft, whereby said leads are supported close to the axis of the hollow shaft and are effectually held against movement relative to the shaft. At the same time, the rigid supporting member for the ends of the hollow-shaft leads is insulatingly mounted and serves the purpose of a connector for connecting the several rotor terminal leads to the conductors 9 which are connected to the several slip rings 8 at the periphery of the slip-ring supporting spider.

I claim as my invention:

1. The combination with a hollow shaft-end subject to vibration, of a plurality of electric conductor leads therein, a current-collecting device mounted on said shaft end, a plurality of separate radially extending insulated terminal connectors, supporting means engaging said connectors at intermediate points between the ends thereof for rigidly supporting the same with respect to said shaft-end, means for joining the inner ends of said terminal connectors to said leads, said terminal connectors being more rigid than said conductor leads whereby they perform the double function of a conductive connection and a rigid support for holding said leads against vibration with respect to said shaft-end, and means for connecting the outer ends of said terminal connectors to said current-collecting device.

2. The combination with a hollow shaft, of relatively flexible electric conductor leads therein, a current-collecting device mounted on said hollow shaft adjacent to the end thereof, said current-collecting device mounting comprising an end face, a plurality of separate, relatively rigid, radially extending, terminal connectors insulatingly clamped, at intermediate points between their ends, to said end face, means for joining the inner ends of said terminal connectors to said leads, and means for connecting the outer ends of said terminal connectors to said current-collecting device.

3. An alternating-current motor comprising a stator member provided with bearings, a rotor member provided with a hollow shaft extending through one of said bearings, rotor terminal leads in said hollow shaft, a slip-ring supporting member on the extension of said hollow shaft outside of said bearing, slip-rings insulatingly supported on said supporting member, slip-ring conductors extending from said slip-rings to the end of said supporting member, rigid terminal connectors insulatingly clamped to the end face of said supporting member, and means for joining said slip-ring conductors and said rotor terminal leads to the respective ends of said rigid terminal conductors whereby said slip-ring conductors are rigidly supported adjacent the places where they leave the slip-ring supporting member and whereby said rotor terminal leads are rigidly supported adjacent the places where they leave the hollow shaft.

4. An alternating-current motor comprising a stator member provided with bearings, a rotor member provided with a hollow shaft extending through one of said bearings, rotor terminal leads in said hollow shaft, a slip-ring supporting member on the extension of said hollow shaft outside of said bearing, slip-rings insulatingly supported on said supporting member, slip-ring conductors extending from said slip-rings to the end of said supporting member, and rigid terminal connectors insulatingly clamped to the end face of said supporting member, each rigid terminal connector comprising an insulated radial portion clamped to the end face of the slip-ring mounting, and two outwardly bent ends joined to a slip-ring conductor and a rotor terminal lead, respectively.

In testimony whereof, I have hereunto subscribed my name this 12th day of April, 1926.

THOMAS S. SCOTT